No. 787,489. PATENTED APR. 18, 1905.
B. F. BERGH.
CONTROLLER FOR PNEUMATIC COMPRESSORS.
APPLICATION FILED DEC. 12, 1903.
2 SHEETS—SHEET 2.
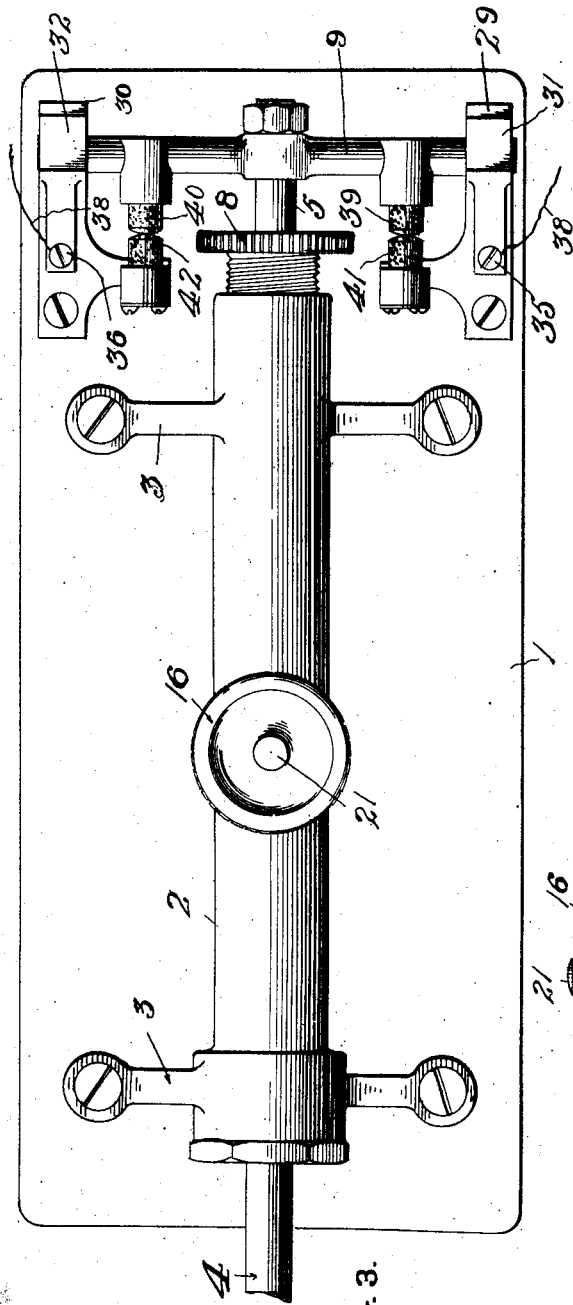
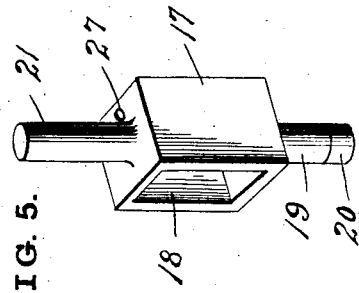
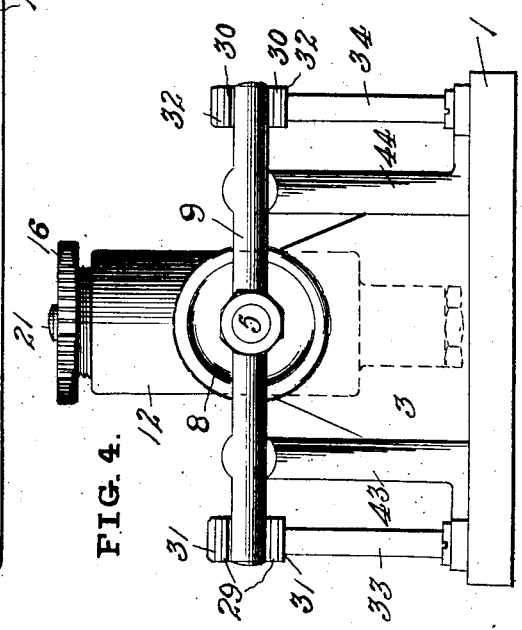
Witnesses
Chas. K. Davis.
Gustave R. Thompson.
Inventor
Bror F. Bergh
by Mauro Cameron Lewis & Massie
his Attorneys No. 787,489.

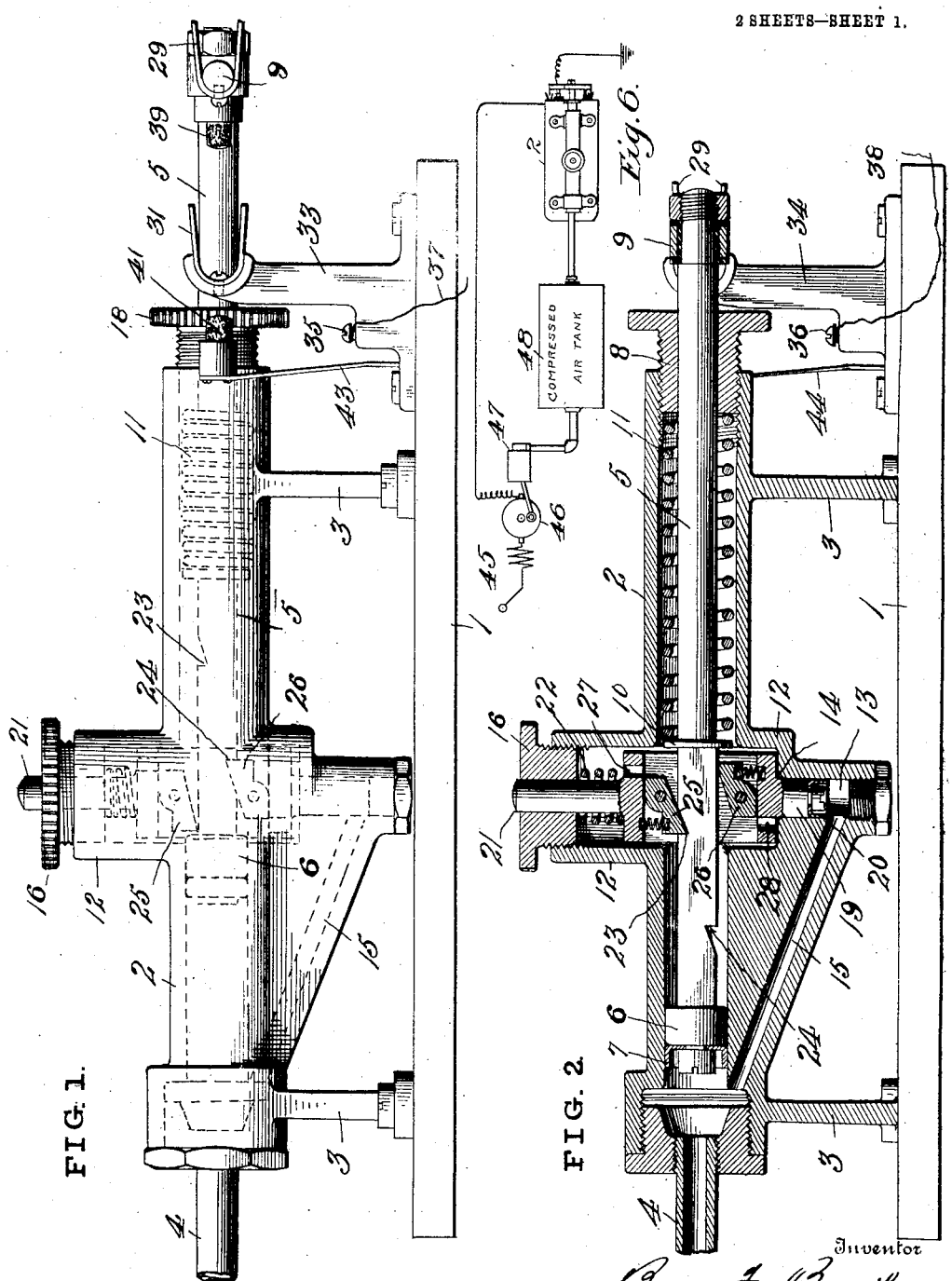

Patented April 18, 1905.

UNITED STATES PATENT OFFICE.

BROR F. BERGH, OF NEW YORK, N. Y.

CONTROLLER FOR PNEUMATIC COMPRESSORS.

SPECIFICATION forming part of Letters Patent No. 787,489, dated April 18, 1905.

Application filed December 12, 1903. Serial No. 184,939.

*To all whom it may concern:*

Be it known that I, BROR F. BERGH, a resident of New York city, State of New York, have invented a new and useful Improvement in Controllers for Pneumatic Compressors, which invention is fully set forth in the following specification.

Under many conditions of use for compressed air it has been found desirable to use the compressed air from a reservoir in which the pressure is desired to be maintained at a certain maximum pressure, it being undesirable that this maximum pressure should be exceeded to any considerable extent at any time. In order to accomplish this result, the compressor is generally operated until the desired pressure in the reservoir is obtained, after which the compressor is stopped or thrown out of connection with the reservoir until the compressor is again put in operation to bring the pressure in the reservoir up to the desired degree.

The object of the present invention is to provide means for controlling the action of the compressor to the end that the compressor may be automatically thrown out of operation, as above indicated, when any desired pressure in said reservoir has been attained, and to automatically start the compressor again when the pressure in the reservoir has fallen below a predetermined limit.

The device will be of use in a great variety of circumstances, and particularly in connection with air-brakes for street or railway cars, where a given reservoir-pressure is desired for operating the brakes, to the end that the braking action may be always of a uniform character.

With the objects above mentioned in view the invention consists in a vibratory member which controls the action of the motor which drives the compressor, said member being subject to reservoir-pressure, so as to cause it to move in one direction, and to spring-pressure tending to move it in the opposite direction, together with means normally restraining said vibratory member against movement under the reservoir-pressure, which means are released automatically when the pressure in the reservoir has reached the maximum desired, when the pressure acts to quickly move said member and compress the opposing spring, whereupon it is engaged by an additional retaining device which holds it in such position with the spring compressed. This movement of the vibratory member under the reservoir-pressure acts to throw the motor which actuates the compressor out of operation. The parts remain in this position until the pressure in the reservoir has been reduced by use or leakage to a predetermined point, when the retaining device which holds the vibratory member against the action of its spring is automatically tripped and the spring throws the said member in the opposite direction and against reservoir-pressure, thereby again bringing the motor which operates the compressor into active operation. This vibratory member may be variously constructed. Thus it may have either a reciprocatory or oscillatory movement. In fact, the inventive idea involved may receive various mechanical expressions. For the purpose of illustrating the invention reference is had to the accompanying drawings, which illustrate one form which the invention may assume.

In said drawings, Figure 1 is a side elevation of the controller designed to operate in connection with an electric motor for operating a compressor to compress air into a reservoir, the motor, compressor, and reservoir not being shown, as they form no part of the present invention. Fig. 2 is a vertical longitudinal section of Fig. 1, except that in Fig. 1 the parts are shown in position for throwing the motor out of action, while in Fig. 2 the parts are in the position for throwing the motor into action. Fig. 3 is a plan view of Fig. 2. Fig. 4 is an end elevation of Fig. 3. Fig. 5 is a perspective view of the actuating element for the retaining devices, and Fig. 6 shows diagrammatically the controller with its connections to the motor and air-reservoir.

Referring to the drawings, in which like reference-numerals refer to like parts, 1 is any suitable insulating-base, upon which is mounted a cylinder 2, supported upon any suitable standards 3. Leading from one end of said cylinder 2 is a pipe or conduit 4, which connects with the compressed-air reservoir. (Not shown.) Within the cylinder 2 is a reciprocating member, here shown in the form of a rod 5, which has upon the end adjacent to the reservoir a piston 6, with an air-tight fit in the cylinder, which fit is preferably augmented by suitable packing, as a leather cup 7. On the opposite end of the rod 5 from the piston 6 the rod projects out through a screw-threaded closure 8 and bears a transverse cross-head 9. (See Figs. 3 and 4.) Intermediate its ends the piston-rod 5 is provided with a collar or abutment 10, having a spring 11, which is interposed around the rod between the collar 10 and the screw-threaded stuffing-box 8. Preferably the portion of the rod surrounded by the spring 11 is cylindrical in cross-section, while that portion between the piston 6 and the collar 10 is rectangular in cross-section.

The cylinder 2 intermediate its ends is provided with a cross-cylinder 12, the ends of which project above and below the cylinder 2, the lower end being contracted, so as to afford a small cylindrical portion 13 and an annular shoulder 14. The lower end of this reduced cylindrical portion 13 communicates by way of a conduit 15 with the conduit 4, leading to the compressed-air reservoir. The upper end of the cylinder 12 is closed by a screw-threaded closure 16, and within said cylinder 12 a detent-operating device 17, Figs. 2 and 5, is mounted to vibrate on a line transverse to that of the rod 5. This detent-actuating device 17 is here shown as rectangular in form and has an opening 18 therethrough of sufficient length and breadth to allow it to reciprocate freely without interfering with the movement of the rod 5. On the lower end of this rectangular frame 17 is a rod 19, bearing a piston 20, which accurately fits the reduced cylinder 13, and on the upper end of the rectangular frame 17 is a guide-rod 21, which projects outward through a central opening in the stuffing-box 16, any suitable packing being provided to render the joint between the rod and the stuffing-box practically air-tight. A spring 22 surrounds the rod 21 between the top of the rectangular frame and the bottom of the screw-threaded stuffing-box, the tension of this spring being regulated by adjustment of the screw-threaded stuffing-box 16. The squared portion of the rod 5 is provided with two detent-notches 23 and 24, one of which is formed in the upper and the other in the lower surface of the rod, and the frame 17 has pivoted therein spring-pawls 25 and 26, so positioned that when the frame 17 is in its lowermost position the pawl 25 will engage the notch 23 when it passes thereunder, while the pawl 26 will engage the notch 24 when the frame 17 is in its uppermost position if the notch is brought over the pawl. It will be evident that if the pressure in the reservoir is sufficient when acting upon the piston 20 to overcome the tension of the spring 22 the frame would be shifted upward from the position shown in Fig. 2 and the pawl 25 withdrawn from the notch 23, and, on the other hand, if the pressure in the reservoir falls below the adjusted tension of the spring 22 the spring would throw the frame 17 downward from the position shown in dotted lines in Fig. 1 and disengage the pawl 26 from the notch 24. For the purpose of preventing any trapping of air above or below the frame 17 openings 27 and 28 may be formed in the upper and lower walls of the frame, though this is not essential, as the fit of the frame in the casing 12 may be such as to permit a free passage of air around the same.

The cross-head 9, borne on the outer end of the rod 5, bears contact-plates 29 and 30, which make electrical contact with plates 31 and 32, supported on suitable standards 33 and 34, composed of any suitable electrically-conductive material and mounted upon the insulating-base 1. These standards 33 and 34 are provided with suitable binding-screws 35 and 36 for receiving electrical conductors 37 and 38, one of which leads from the source of electrical energy and the other leads to any suitable electrical motor. In addition to the metallic contacts 29 31 30 32 there are provided two sets of carbon contacts. The cross-head 9 bears the carbon points 39 and 40, which when the parts are in the position shown in Figs. 2 and 3 (being the position for permitting current to pass to the motor) contact with carbon points 41 and 42, borne, respectively, upon spring-arms 43 and 44, composed of electrically-conductive material and mounted upon or in electrical connection with the standards 32 and 34. The tension of the spring-arms 43 and 44 is so adjusted that the carbon points 41 and 42 carried thereby are held in firm contact with the carbon points 39 and 40 supported by the cross-head when said cross-head is in the position shown in Figs. 2 and 3—i. e., in position to close the circuit through the motor. Furthermore, the tension of the springs 43 and 44 is such that when the cross-head 9 begins to move from the position shown in Fig. 3 to that shown in Fig. 1 the carbon points 41 and 42 remain in contact with the carbon points 39 and 40 for a short space of time after contact-plates 29 and 30 have separated from the contact-plates 31 and 32. The result of this is that the formation of an arc between the metallic contact-plates, together with the destructive effects thereof, are avoided, since a sufficient portion of the current to accomplish this result passes through the carbon points until the time when the metallic contact-plates have become so far separated as to prevent arcing. Should any arc occur between the carbon points, the results would not be of any serious moment, as these points can be readily renewed.

The operation of the device is as follows: The conduit 4 being connected to the reservoir, and the tension of the spring 11 being regulated by means of the screw-threaded stuffing-box 8 to the desired tension, and the tension of the spring 22 being regulated by adjusting screw-threaded stuffing-box 16 to the point where it will yield when the pressure in the reservoir reaches the desired maximum, and all the parts being in the position indicated in Figs. 2 and 3, the motor continues to operate the compressor, gradually raising the pressure in the reservoir. The tendency of this pressure as exerted upon piston 6 is to drive said piston from left to right as seen in Fig. 2 and against the tension of the spring 11; but this is resisted by the engagement of the detent 25 in the notch 23. The tendency of the pressure in the reservoir which reaches the piston 20 by way of the conduit 15 is to elevate the detent-frame 17, so as to disengage the detent-pawl 25 from the notch 23; but this is resisted by the spring 22. When, however, the pressure in the reservoir reaches the desired maximum, which has been determined by the adjustment of the tension on the spring 22, the piston 20, and with it the detent-frame 17, is moved against the tension of the spring 22, thereby withdrawing the detent-pawl 25 from the notch 23 and at the same time rocking detent-pawl 26 upon its pivot and against the tension of its spring. As soon as the pawl 25 is withdrawn from engagement with the notch 23 the reservoir-pressure, acting on the piston 6, suddenly throws the piston from left to right, compressing the spring 11 and bringing the detent-notch 24 over the pawl 26, which pawl thereupon engages in said notch, as shown in dotted lines in Fig. 1, retaining the rod 5 in a position to compress the spring 11. This sudden shifting of the rod 5 throws the crosshead 9 outward from the position shown in Fig. 3 to that shown in Fig. 1, thereby separating the metallic contact-plates 29 and 30 from the plates 31 and 32 and the carbon points 39 and 40 from carbon points 41 and 42. These carbon points, however, remain in contact for an instant after the metallic plates have been separated, as hereinbefore described. This action serves to interrupt the current flowing to the motor, and thus stops the same. Air being now taken from the reservoir for any desired purpose serves to lower the pressure therein, and when this has been carried to a point below that of the adjusted tension of the spring 22 the spring acts to shift the frame 17 from the position shown in Fig. 1 to the position shown in Fig. 2, when the spring 11 suddenly acts to throw the rod 5 from the position shown in Fig. 1 to that shown in Fig. 2, when the detent-pawl 25 again engages the detent-notch 23.

It will be seen that while the device is exceedingly simple in character, with the parts cheaply constructed and not easily put out of order, it is capable of ready adjustment and effectively operates to cut out the motor, and thus control the compressor, without producing the dangerous and destructive arcing effects so liable to occur in structures of this character.

Fig. 6 shows diagrammatically the controller and its connections. 45 is an electric terminal. 46 is a motor operating a pump 47, which compresses air in reservoir 48, and 2 is the controller and circuit-breaker. Its operation is apparent from the drawings and above description.

What is claimed is—

1. In a pneumatic-pump controller, the combination of a motor-controlling vibratory member subjected to reservoir-pressure, a single spring opposing said pressure, means normally restraining said member against movement under reservoir-pressure, and a releasing device for said means and actuated by reservoir-pressure of a predetermined degree whereby the said vibratory member is actuated by the difference in pressure between that of reservoir-pressure and said spring-pressure.

2. In a pneumatic-pump controller, the combination of a motor-controlling vibratory member subjected to reservoir-pressure, a single spring opposing said pressure, means normally restraining said member against movement by said spring when the reservoir-pressure falls below the spring tension, and a releasing device actuated against reservoir-pressure whereby the said vibratory member is actuated by the difference in pressure between that of reservoir-pressure and said spring-pressure.

3. In a pneumatic-pump controller, the combination of a motor-controlling vibratory member subjected to reservoir-pressure, a single spring opposing said pressure, means normally restraining said member against movement by either the reservoir-pressure or the spring, and a releasing device for said means which device is actuated alternately by and against reservoir-pressure whereby the said vibratory member is actuated by the difference in pressure between that of reservoir-pressure and said spring-pressure.

4. In a pneumatic-pump controller, the combination of a motor-controlling reciprocating member subjected to reservoir-pressure, a single spring opposing said pressure, a detent holding said member against reservoir-pressure, and detent-releasing means actuated by reservoir-pressure of a predetermined degree whereby the said vibratory member is actuated by the difference in pressure between that of reservoir-pressure and said spring-pressure.

5. In a pneumatic-pump controller, the combination of a motor-controlling reciprocating member subjected to reservoir-pressure, a single spring opposing said pressure means normally restraining said member against movement under reservoir-pressure, and a releasing device actuated by reservoir-pressure of a predetermined degree whereby the said vibratory member is actuated by the difference in pressure between that of reservoir-pressure and said spring-pressure.

6. In a pneumatic-pump controller, the combination of a circuit-closing device, a reciprocating member in operative relation therewith and subjected to reservoir-pressure, means normally restraining said member against movement under reservoir-pressure, and a releasing device actuated by reservoir-pressure of a predetermined degree whereby the said vibratory member is actuated by the difference in pressure between that of reservoir-pressure and said spring-pressure.

7. In a pneumatic-pump controller, the combination of a motor-controlling vibratory member subjected to reservoir-pressure, a single spring opposing said pressure, tension-adjusting means for said spring, means normally restraining said member against movement under reservoir-pressure, and a releasing device for said means and actuated by reservoir-pressure of a predetermined degree whereby the said vibratory member is actuated by the difference in pressure between that of reservoir-pressure and said spring-pressure.

8. In a pneumatic-pump controller, the combination of a motor-controlling vibratory member subjected to reservoir-pressure, a single spring opposing said pressure, tension-adjusting means for said spring, means normally restraining said member against movement by said spring when the reservoir-pressure falls below the spring tension, and a releasing device actuated against reservoir-pressure whereby the said vibratory member is actuated by the difference in pressure between that of reservoir-pressure and said spring-pressure.

9. In a pneumatic-pump controller, the combination of a cylinder open at one end to reservoir-pressure, a piston in said cylinder exposed at one side to reservoir-pressure, a spring on the other side of said piston, a piston-rod attached to said piston, means controlled by reservoir-pressure for alternately restraining and releasing said piston-rod, and power-controlling means operated by the piston-rod.

10. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, and a detent normally restraining said piston against movement by reservoir-pressure.

11. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, and a detent restraining said piston from movement by said spring when the latter is compressed.

12. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, a detent normally restraining said piston against movement by reservoir-pressure, and a detent-releasing device actuated by reservoir-pressure of a predetermined degree.

13. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, a detent restraining said piston from movement by said spring when the latter is compressed, and a detent-releasing device actuated against reservoir-pressure below a predetermined degree.

14. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, a detent normally restraining the piston-rod against movement by the piston, and a detent-releasing slide actuated by reservoir-pressure.

15. In a pneumatic-pump controller, the combination of a cylinder open at one end to reservoir-pressure, a piston in said cylinder exposed at one side to reservoir-pressure, a spring on the other side of said piston, a piston-rod attached to said piston, power-controlling means operated by the piston-rod, a detent restraining said piston-rod against movement by said spring when compressed, and a spring-actuated detent-releasing slide moving against reservoir-pressure.

16. In a pneumatic-pump controller, the combination of a cylinder open at one end to reservoir-pressure, a piston in said cylinder and exposed on one side to said pressure, a spring acting on the other side of the piston, a piston-rod attached to said piston, power-controlling means operated by said rod, reversely-inclined detents alternately engaging the rod, whereby it is restrained from movement by the piston or the spring as the case may be, and a detent-releasing device controlled by reservoir-pressure.

17. In a pneumatic-pump controller, the combination of a vibratory member actuated in one direction by reservoir-pressure, a spring acting against said member in the opposite direction, power-controlling means operated by said member, a slide moving transversely to the path of said member, two detents carried by said slide and facing in opposite directions, oppositely-facing abutments on said member, means admitting reservoir-pressure to move the slide in one direction, and a spring opposing said movement.

18. In a device for controlling a pneumatic pump which is actuated by electricity, the combination of a vibratory member forming part of the circuit and subjected to reservoir-pressure tending to move it in one direction, a spring tending to move said member in the other direction, detents arranged to alternately oppose the movements of said member, and detent-releasing means automatically controlled by reservoir-pressure whereby the said vibratory member is actuated by the difference in pressure between that of reservoir-pressure and said spring-pressure.

19. In a pneumatic-pump controller, the combination of a cylinder open at one end to reservoir-pressure, a piston in said cylinder exposed at one side to said reservoir-pressure, a spring on the other side of said piston, a piston-rod attached to said piston, a cross-cylinder surrounding said piston-rod, a restraining device located in the cross-cylinder, and means actuated by reservoir-pressure for operating said device to alternately retain and release the piston-rod.

20. In a pneumatic-pump controller, the combination of a cylinder open at one end to reservoir-pressure, a piston in said cylinder exposed at one side to said reservoir-pressure, a spring on the other side of said piston, a piston-rod connected to said piston, a cross-cylinder surrounding said piston-rod, a piston in said cross-cylinder exposed to reservoir-pressure, means normally restraining said piston-rod against movement by either the reservoir-pressure or the spring, and a releasing device for said means actuated by the piston in said cross-cylinder.

21. In a pneumatic-pump controller, the combination of a cylinder open at one end to reservoir-pressure, a piston in said cylinder exposed at one side to said reservoir-pressure, a spring on the other side of said piston, a piston-rod attached to said piston, power-controlling means operated by the piston-rod, means for restraining the movement of the piston-rod located intermediate the piston and said spring, and a piston exposed to said reservoir-pressure for actuating said restraining means.

22. In a pneumatic-pump controller, the combination of a cylinder open at one end to reservoir-pressure, a piston in said cylinder exposed at one side to said reservoir-pressure, a spring on the other side of said piston, a piston-rod attachment to said piston, power-controlling means operated by the piston-rod, means for restraining the movement of said piston-rod, and a piston exposed to said reservoir-pressure for actuating said restraining means.

In testimony whereof I have signed this specification in the presence of two subscribing witnesses.

BROR F. BERGH.

Witnesses:
C. A. L. MASSIE,
R. L. SCOTT.